H. M. LE DUC.
ANTIFRICTION BEARING.
APPLICATION FILED DEC. 10, 1915.

1,198,559.

Patented Sept. 19, 1916.

Inventor
Henry M. Le Duc

By
Wm. D. Hodges
Attorney

UNITED STATES PATENT OFFICE.

HENRY M. LE DUC, OF WASHINGTON, DISTRICT OF COLUMBIA.

ANTIFRICTION-BEARING.

1,198,559. Specification of Letters Patent. Patented Sept. 19, 1916.

Application filed December 10, 1915. Serial No. 66,216.

*To all whom it may concern:*

Be it known that I, HENRY M. LE DUC, a citizen of the United States, residing at Washington, in the District of Columbia, have invented new and useful Improvements in Antifriction-Bearings, of which the following is a specification.

This invention is an improved antifriction device of the roller bearing type.

One of the objects of the invention is to provide an improved bearing of the character referred to, constructed of separable parts capable of being readily assembled or separated.

A further object is to provide means whereby the parts, when in assembled relation, are held against relative displacement.

A further object is to provide means for cushioning the parts against shocks, and to deaden rattling, or other sounds, incident to the relative rotation of the parts.

A further object is to provide means whereby relative slipping of the rotating parts is prevented.

The invention will be hereinafter fully set forth and particularly pointed out in the claims.

Figure 1:
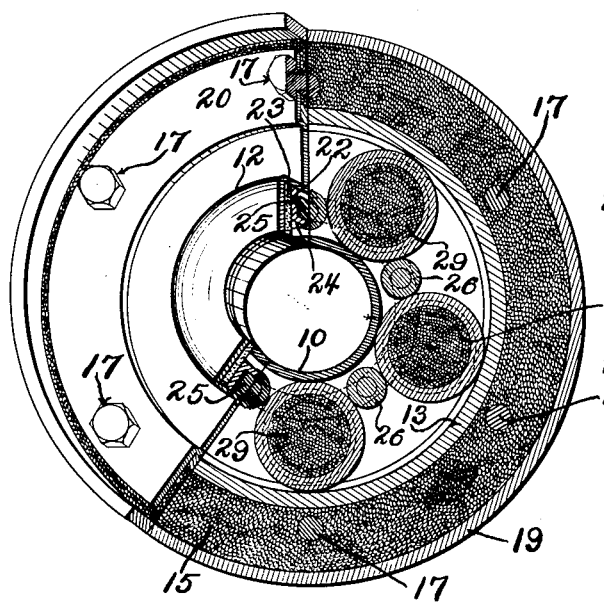
Figure 2:
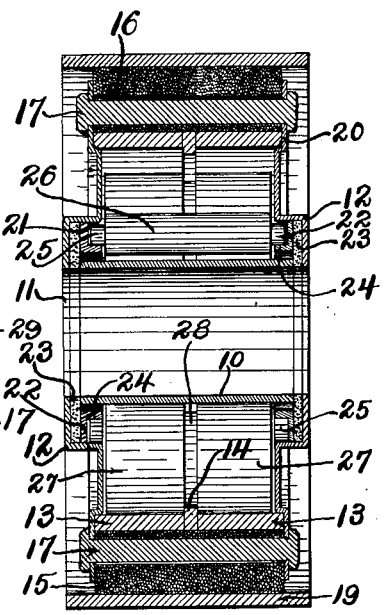
Figures 5, 6, 7, 8, 9:
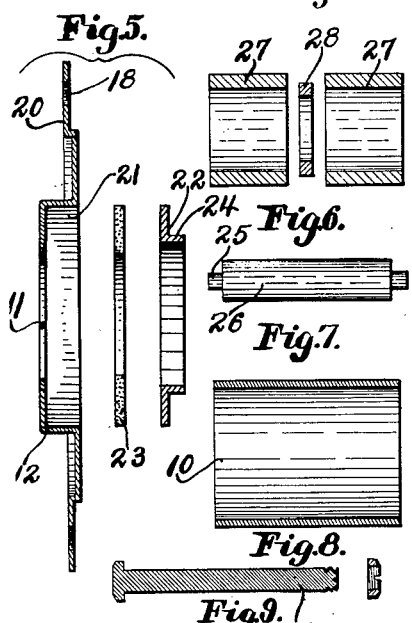
Figure 4:
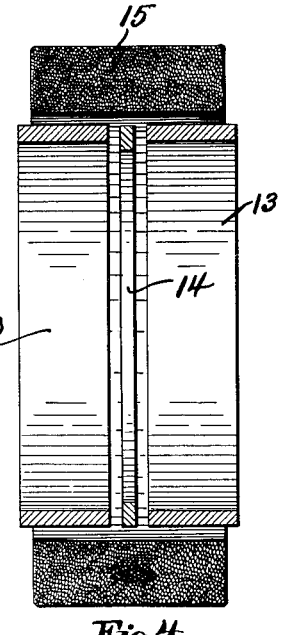
Figure 3:
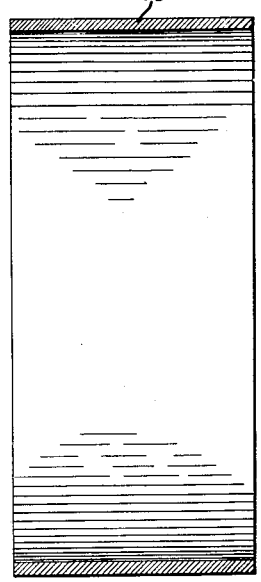

In the accompanying drawing: Figure 1 is a side view, partly in section, illustrating the invention. Fig. 2 is a vertical sectional view thereof. Fig. 3 is a detail sectional view illustrating the outer casing. Fig. 4 is a detail sectional view illustrating the parts of the roller retaining device. Fig. 5 is a detail sectional view illustrating the parts of one of the end caps, and its adjuncts. Fig. 6 is a detail sectional view of the parts of one of the large anti-friction rollers. Fig. 7 is a detail view of one of the small rollers. Fig. 8 is a detail view of the bushing. Fig. 9 is a detail view of one of the clamping bolts.

Referring to the drawing, 10 designates a bushing, the ends of which coincide with suitable openings 11, formed in end caps 12, which are of circular form. Interposed between the end caps 12, is a roller retaining device comprising two annular rings 13, and a second, narrower ring 14, the outside diameter of all of said rings being the same, the inside diameter of the ring 14, being somewhat less than the corresponding diameter of the rings 13. The combined width of the rings 13 and 14 corresponds to the space between the end caps 12. The rings 13 and 14 are placed in alinement, with the ring 14 interposed between the rings 13, and said rings are inclosed by a ring 15 of elastic, sound deadening material, preferably sponge rubber, although the invention is not limited in this particular. The ring 15 is provided with transverse openings 16 for the passage of bolts 17, which are also passed through coinciding openings 18 in the rings 12, said bolts serving to clamp the rings 13, 14 and 15 between the end caps 12, as clearly illustrated in Fig. 2. The rings 13, 14, and 15, and the peripheries of the end caps 12, are inclosed within an annular casing 19, the ring 15 being under compression, so as to closely engage the inner surface of the casing, and act as a cushioning means between the casing and the roller retaining device. The end caps 12 are provided with offset portions 20, to provide annular shoulders to fit within the rings 13, thereby holding the parts in definite relation.

Each end cap is provided with a central chamber 21 to receive a ring 22, of L-shape in cross section, a dust excluding washer 23 being interposed between said ring 22 and the outer wall of chamber 21, and contacting with the bushing 10. The horizontal surface 24 of the ring 22, forms a track or bearing for the trunnion 25 of a small anti-friction roller 26, a plurality of said rollers being employed. Alternating with the rollers 26 are larger rollers each composed of spaced apart rings 27, having interposed between them a ring 28, narrower in width and smaller in diameter, all of said rings being provided with a filling of cushioning material 29, of any suitable substance, preferably sponge rubber, which material so unites the rings 27 and 28 as to provide a roller having a middle groove or depression. The diameter of the rings 27 is such that the peripheries of said rings contact with the inner faces of the rings 13 and the exterior surface of the bushing 10, and the rollers 26 are of such a size that when mounted on the tracks 24, they will contact with the peripheries of the rings 27 of the respective large rollers. The grooves formed by the rings 28 coincide with and receive the inner edge of the ring 14.

From the foregoing, it will be readily understood that the end caps 12 may be readily separated by disengaging the bolts 17, whereupon the parts held by said caps may be removed, or injured parts replaced, after which the rings may be again readily clamped together. The ring 14, and the grooves formed by the rings 28, coöperate to prevent longitudinal displacement of the larger rollers, and the diameters of the larger rollers, and those of the smaller rollers, are so proportioned that the rollers maintain an antifriction contact, and will rotate without slipping. By providing the ring 15, the parts inclosed within the casing 19 are cushioned against shocks, and said ring 15 also serves to deaden any noise incident to slight relative movement of the parts. By forming the larger rollers of the rings 27 and 28, and uniting them by the cushioning material, a certain amount of elasticity is permitted, and said material serves further to cushion the parts and deaden the sounds.

Having thus explained the nature of my invention and described an operative manner of constructing and using the same, although without attempting to set forth all of the forms in which it may be made, or all of the forms of its use, what I claim is:—

1. An antifriction bearing comprising a bushing, end caps located at the ends of said bushing, a casing surrounding said end caps, cushioning material carried by said end caps and bearing against the inner surface of said casing, and antifriction members interposed between the bushing and the casing.

2. An antifriction bearing comprising a bushing, end caps located at the ends of said bushing, an annular roller retaining device located between said end caps, a casing surrounding said roller retaining device and said end caps, cushioning material carried by said end caps and interposed between said roller retaining device and said casing, and antifriction members inclosed within said roller retaining device.

3. An antifriction bearing comprising a bushing, end caps located at the ends of said bushing, an annular roller retaining device located between said end caps, a casing surrounding said roller retaining device and said end caps, a ring of cushioning material carried by said end caps and surrounding said roller retaining device being interposed between the latter and said casing, and antifriction members inclosed within said roller retaining device.

4. An antifriction bearing comprising a bushing, end caps located at the ends of said bushing, an annular roller retaining device located between said end caps, a casing surrounding said roller retaining device, a ring of cushioning material surrounding said roller retaining device and interposed between the latter and said casing, bolts for clamping said cushioning ring between said end caps, and antifriction members inclosed within said roller retaining device.

5. An antifriction bearing comprising a bushing, end caps located at the ends of said bushing and provided with annular shoulders, an annular roller retaining device located between said caps and seated on said shoulders, a casing surrounding said roller retaining device and said end caps, and antifriction members inclosed within said roller retaining device.

6. An antifriction bearing comprising a bushing, end caps located at the end of said bushing, an annular roller retaining device clamped between said end caps and formed of a plurality of sections, one of said sections forming a guide rib, a casing surrounding said roller retaining device, and rollers located in said roller retaining device and provided with annular grooves engaging said rib.

7. An antifriction bearing comprising a bushing, end caps located at the ends of said bushing, a roller retaining device clamped between said end caps and composed of annular rings having a second ring of smaller internal diameter interposed between them to form an annular rib, rollers located within said antifriction member and having annular grooves guided by said rib, and a casing inclosing said roller retaining device.

8. An antifriction bearing comprising a bushing, end caps located at the ends of said bushing and each having a chamber formed therein, an annular roller retaining device clamped between said end caps, a casing surrounding said roller retaining device, tracks located in the chambers of said end caps, rollers interposed between said bushing and said roller retaining device, and smaller rollers alternating with the first mentioned rollers and having portions rotatably mounted upon said tracks.

9. An antifriction bearing comprising a bushing, end caps located at the ends of said bushing and each having a chamber formed therein, an annular roller retaining device clamped between said end caps, a casing surrounding said roller retaining device, rollers bearing upon said bushing and said roller retaining device, rings in the chambers of said end caps, each ring being provided with an annular extension forming a track, and smaller rollers rotatably mounted upon said tracks and alternating with the larger rollers.

10. An antifriction bearing comprising a bushing, end caps located at the ends of said bushing, an annular roller retaining device clamped between said end caps and provided with an internal annular rib, a casing surrounding said roller retaining device, rollers inclosed within said roller retaining device and each composed of rings having a smaller ring interposed between them to provide an annular groove for engaging said rib, and means for holding said rings in operative relation.

11. An antifriction bearing comprising a bushing, end caps located at the ends of said bushing and each provided with a chamber, an annular roller retaining device clamped between said end caps and provided with an internal annular rib, a casing surrounding said roller retaining device, rollers inclosed within said roller retaining device and each composed of spaced rings having a smaller ring interposed between them to provide an annular groove for engaging said rib, and means for holding said rings in operative relation, track rings located in the chambers of said end caps, and small rollers mounted on said tracks and alternating with the first mentioned rollers.

12. An antifriction bearing comprising a bushing, end caps located at the ends of said bushing, an annular roller retaining device clamped between said end caps and provided with an internal annular rib, a casing surrounding said roller retaining device, rollers inclosed within said roller retaining device and each composed of two spaced rings having a ring of smaller diameter interposed between them to provide an annular groove for engaging said rib, and a filling of cushioning material for holding said rings in operative relation.

13. An antifriction bearing comprising a bushing, a roller retaining device, anti-friction rollers interposed between said bushing and said roller retaining device, an external casing, and a ring of elastic material inclosing said roller retaining device, and held under transverse compression between the latter and said casing.

14. As an improvement in antifriction bearings, a roller retaining device, a casing inclosing the same, and a ring of elastic material filling the space between said casing and said roller retaining device, and held under transverse compression between the casing and roller retaining device.

15. As an improvement in antifriction bearings, a roller retaining device, an external casing, and a ring of cushioning material interposed between said roller retaining device and said casing, and held under transverse compression between the casing and roller retaining device.

16. As an improvement in antifriction bearings, a roller formed of a plurality of alined rings united by a filling of cushioning material.

17. As an improvement in antifriction bearings, a roller formed of a pair of rings having a second ring of smaller diameter interposed between them, said rings being united by a filling of flexible material.

18. As an improvement in antifriction bearings, a roller formed of a pair of rings having a second ring of smaller diameter and narrower width interposed between them, said rings being united by a filling of flexible material.

In testimony whereof I have hereunto set my hand.

HENRY M. LE DUC.